(12) United States Patent
Parekh (10) Patent No.: US 10,612,456 B2
(45) Date of Patent: Apr. 7, 2020

(54) FAN SHROUD ASSEMBLY

(71) Applicant: Bipin Parekh, Plymouth, MI (US)

(72) Inventor: Bipin Parekh, Plymouth, MI (US)

( * ) Notice: Subject to any disclaimer, the term of this patent is extended or adjusted under 35 U.S.C. 154(b) by 0 days.

(21) Appl. No.: 16/107,154

(22) Filed: Aug. 21, 2018

(65) Prior Publication Data
US 2019/0085756 A1    Mar. 21, 2019

Related U.S. Application Data

(60) Provisional application No. 62/560,747, filed on Sep. 20, 2017.

(51) Int. Cl.
*F02B 29/04* (2006.01)
*F01P 5/06* (2006.01)
*F01P 11/10* (2006.01)
*F02M 35/10* (2006.01)
*F01P 5/02* (2006.01)

(52) U.S. Cl.
CPC ............ *F02B 29/0431* (2013.01); *F01P 5/02* (2013.01); *F01P 5/06* (2013.01); *F01P 11/10* (2013.01); *F02B 29/0456* (2013.01); *F02M 35/10078* (2013.01); *F02M 35/10144* (2013.01); *F02M 35/10321* (2013.01)

(58) Field of Classification Search
CPC .............. F02B 29/0431; F02B 29/0425; F02B 29/0456; F02M 35/10078; F02M 35/10321; F02M 35/10144; F01P 1/00; F01P 2001/005; F01P 5/00; F01P 5/02; F01P 2005/025; F01P 5/06; F01P 11/10; F01P 11/12
See application file for complete search history.

(56) References Cited

U.S. PATENT DOCUMENTS

| | | | |
|---|---|---|---|
| 2005/0079051 A1* | 4/2005 | Soofer | F01P 11/029 415/215.1 |
| 2008/0283215 A1* | 11/2008 | Saida | B60H 1/00828 165/43 |
| 2016/0290280 A1* | 10/2016 | Blankenship | F02G 5/02 |

* cited by examiner

*Primary Examiner* — Jacob M Amick
(74) *Attorney, Agent, or Firm* — Carlson, Gaskey & Olds, P.C.

(57) ABSTRACT

A fan shroud assembly according to an example of the present application includes an air intake duct configured to receive ambient air, a fan configured to receive hot air, a motor driving the fan, and an air induction intake box in fluid communication with the fan and the air intake duct to mix the hot air and the ambient air. A vehicle and a method of providing cooling air to a vehicle engine are also disclosed.

20 Claims, 7 Drawing Sheets

FAN SHROUD ASSEMBLY

CROSS-REFERENCE TO RELATED APPLICATIONS

This application claims the benefit of U.S. Provisional Application Ser. No. 62/560,747, filed Sep. 20, 2017, which is hereby incorporated by reference.

BACKGROUND

Engines in vehicles, such as internal combustion engines in automobiles, generate heat as they operate. In general, internal combustion engines facilitate the combustion of fuel with air (which acts as an oxidizer). In automobiles, engines are situated in an engine compartment, which is typically at the front end of the vehicle. Removal of heat generated by the engine from the engine and the engine compartment improves engine and overall vehicle performance. Furthermore, internal combustion engines operate more efficiently when provided with cooler air.

SUMMARY

A fan shroud assembly according to an example of the present application includes an air intake duct configured to receive ambient air, a fan configured to receive hot air, a motor driving the fan, and an air induction intake box in fluid communication with the fan and the air intake duct such that the hot air and the ambient air mix.

A vehicle according to an example of the present application includes an engine arranged in an engine compartment and a fan shroud assembly. The fan shroud assembly includes a fan configured to draw hot air from the engine compartment. The fan is driven by a motor. The fan shroud assembly also includes an air intake duct configured to receive ambient air from outside the vehicle, and an air induction intake box in fluid communication with the fan and the air intake duct such that the hot air and the ambient air mix to form cooling air. The air induction intake box is configured to provide the cooling air to a vehicle component.

A method of providing cooling air to a vehicle engine according to an example of the present application includes drawing hot air from an engine of a vehicle with a fan, mixing the hot air with ambient air from outside the vehicle, and providing the mixed air back to the engine, wherein the mixed air has a temperature that is lower than a temperature of the hot air due to the mixing.

DETAILED DESCRIPTION

Figure 1:
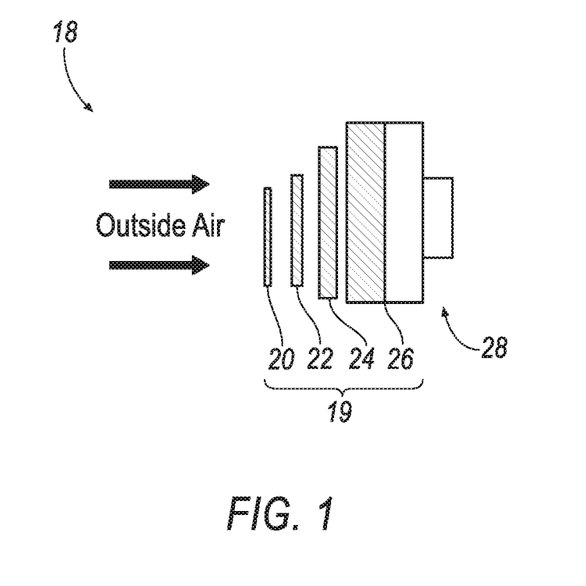
FIG. 1 schematically shows a vehicle with a fan shroud assembly.
Figure 2:
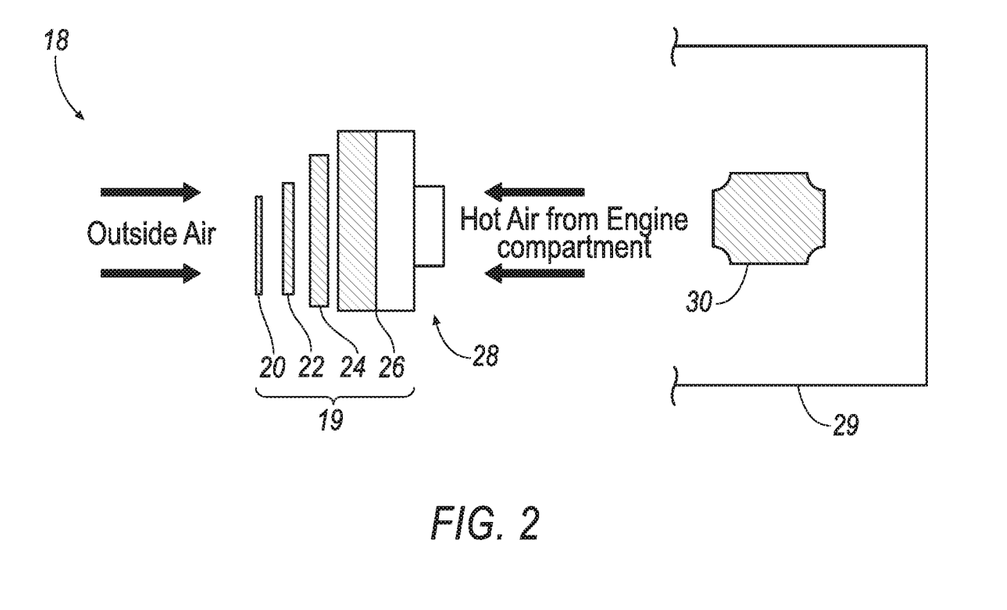
FIG. 2 schematically shows a vehicle with a fan shroud assembly and an engine compartment.

FIGS. 1-2 show a schematic view of a vehicle front end 18. As shown in FIGS. 1-2, the vehicle front end 18 includes one or more heat exchangers 19. In the example of FIGS. 1-2, the one or more heat exchangers 19 includes an oil cooler 20, a transmission cooler 22, a condenser 24, and a radiator 26. The vehicle front end 18 also includes a fan shroud assembly 28 and an engine compartment 29 with an engine 30. The vehicle front end 18 is in one example a front end of a passenger automobile. However, it should be understood the following description is equally applicable to any gas, diesel, hybrid or electric vehicles, including performance or race cars, trucks, buses, ambulances, tractors, construction equipment, and the like. As shown in FIGS. 1-2, "outside" or ambient air from outside the vehicle passes through the oil cooler 20, the transmission cooler 22, the condenser 24, the radiator 26, and the fan shroud assembly 28. In some embodiments, hot air from the engine compartment 29 also flows into the fan shroud assembly 28, as shown in FIG. 2.

Figure 4:
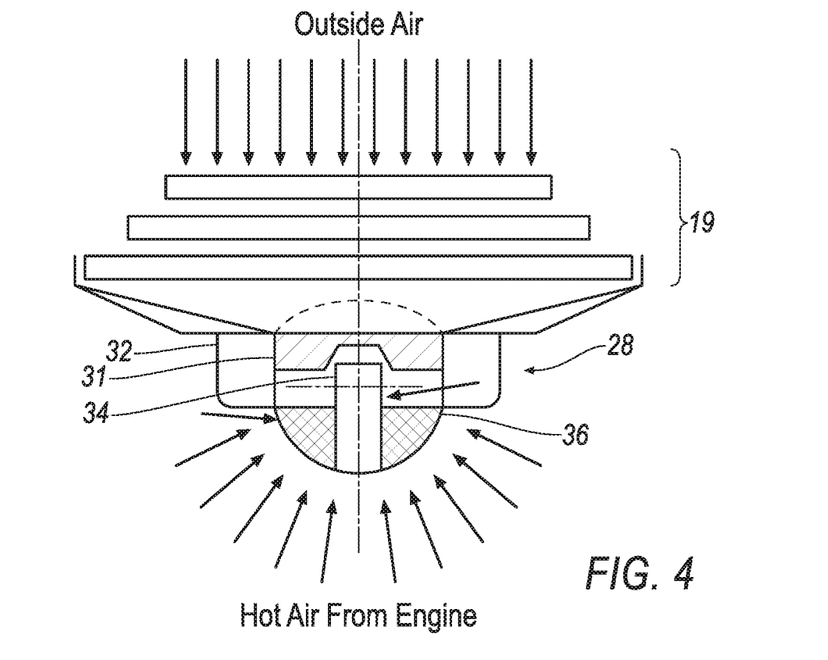
FIG. 4 schematically shows a detail top-down view of the vehicle front end of FIGS. 1-2.
Figure 5:
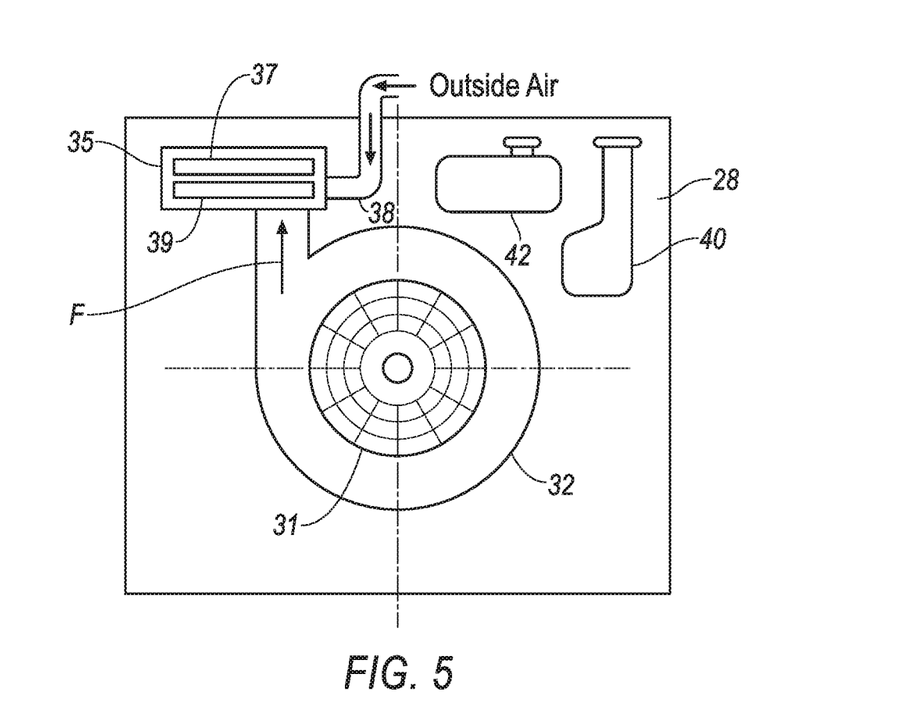
FIG. 5 schematically shows a detail view of the fan shroud assembly of FIGS. 1-4.

FIGS. 4-5 show a detail view of the fan shroud assembly 28. The fan shroud assembly 28 includes a fan 31, which may be a high efficiency fan, arranged in a fan housing 32. The fan shroud assembly 28 also includes a motor 34 for driving the fan 31 and a protective screen 36 for preventing foreign matter from entering the fan housing 32 and thereby air flow F. Because the fan shroud assembly 28 includes a motor 34, the fan 31 can be driven even when the vehicle in which it is situated is stationary. Therefore, the fan shroud assembly 28 can provide cooling and/or turbo charge air to other parts of the vehicle (as will be discussed below) even when the vehicle is stationary.

Figure 3:
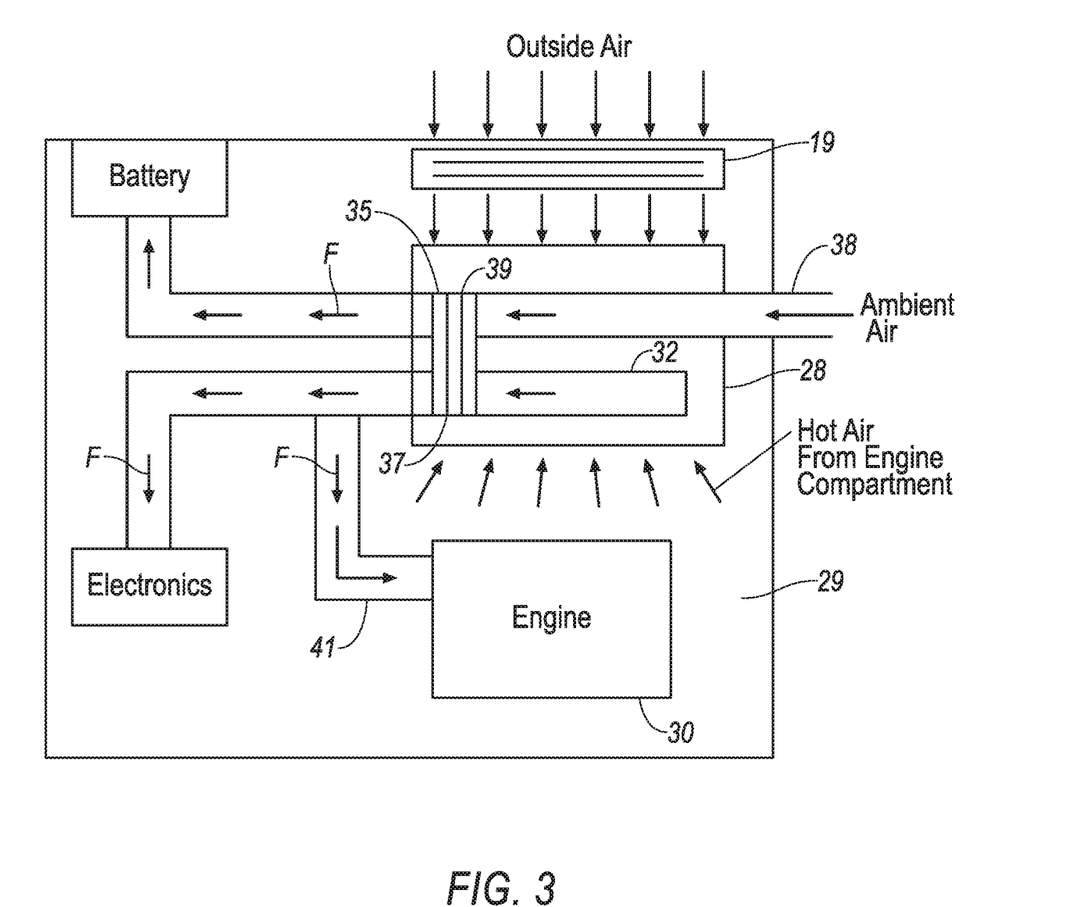
FIG. 3 schematically shows a fan shroud assembly arranged adjacent an engine compartment.

FIG. 3 schematically shows the fan shroud assembly 28 arranged adjacent the engine compartment 29. Outside air from outside the vehicle flows through the one or more heat exchangers 19 and into the fan housing 32, as does hot air from the engine compartment 29. Outside air and hot air from the engine compartment 29 are mixed and cooled by the fan 31 and then provided to an air induction intake box 35. Additionally, ambient air is provided directly to the air induction intake box 35 via a duct 38. Air exiting the fan housing 32 and ambient air mix in the air induction take box 35 to create air flow F. Air flow F is colder than hot air from the engine compartment 29, by virtue of passing through the fan 31 and mixing with the cooler ambient air in the air induction intake box 35.

Air flow F then exits the air induction box 35 and is provided to various components of the vehicle. For example, cool air flow F is supplied back to the engine 30 via duct 41, which allows the fan shroud assembly 28 to act as a turbo charger for the vehicle. Because the fan shroud assembly 28 is arranged adjacent the engine compartment 29, this arrangement eliminates complex ducting that is typically found in vehicle turbo charger systems, which usually are situated in the back end of a vehicle and away from the engine 30 air intake. Additionally, turbo chargers typically draw air from the vehicle's exhaust, which is relatively hot, and cool the air with a turbo charger cooler. Because the air flow F is already relatively cool due to passing through the fan shroud assembly 28, as described above, this arrangement eliminates the need for a separate turbo charger cooler. Finally, because the fan shroud assembly 28 facilitates the removal of hot engine air from an engine compartment 29 as well as the supply of cooler air flow F back to the engine 30 via air induction box 35, the air flow arrangement improves engine efficiency and overall vehicle performance, including transmission and HVAC operation, improves fuel efficiency, and reduces emissions from the vehicle.

It should be understood that the ducting for routing air flow F to various vehicle component as shown in FIG. 3 is exemplary and any ducting arrangement is contemplated by this disclosure.

Figure 6:
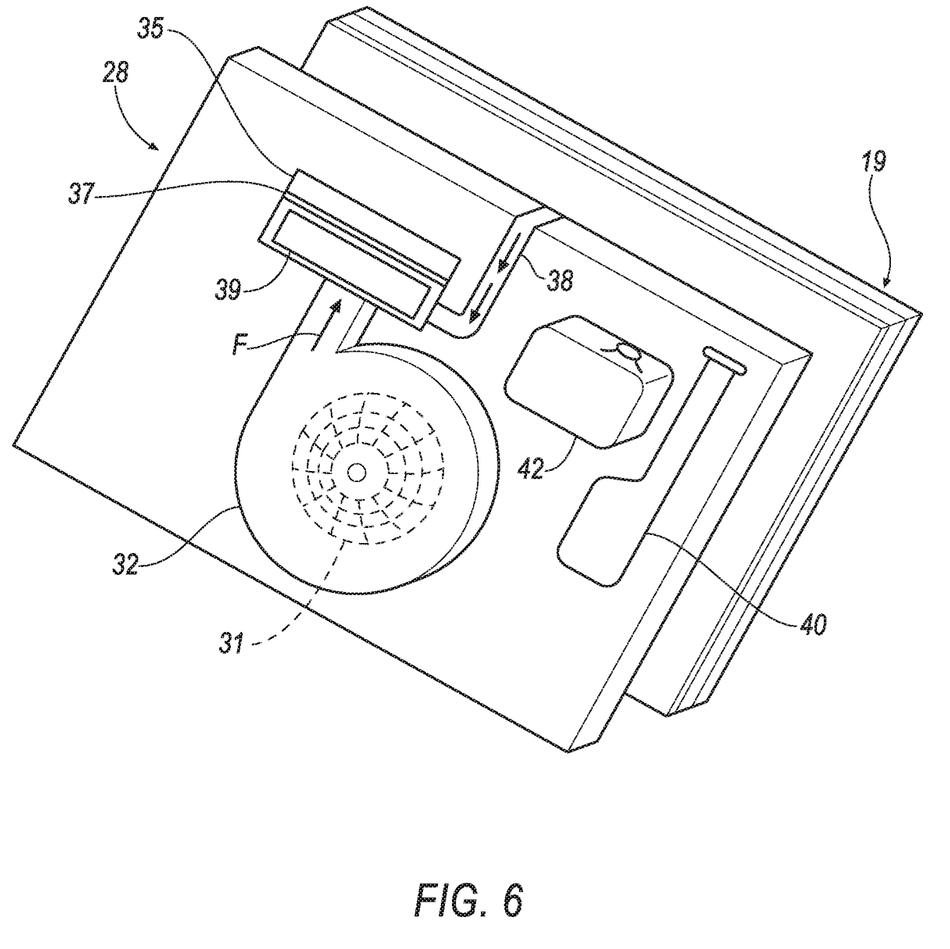
FIG. 6 schematically shows an isometric view of the fan shroud assembly of FIGS. 1-5.

Referring again to FIGS. 4-6, the air induction intake box 35 includes a filter 37 for preventing dust particles and potentially other foreign matters from entering into the engine 30. The air induction intake box 35 also optionally includes a cooler 39, such as an evaporative heat exchanger, which provides additional cooling for air as it exits the air induction intake box 35. In one example, where the air induction intake box 35 does not include a cooler, the air temperature entering the engine could be 5 to 15 degrees F. higher compared to the ambient air temperature. In another example, where the air induction intake box 35 does include a cooler 39, the air flow F is about 30 to 40 degrees F. cooler than ambient air. This provides further benefits to engine performance and fuel economy and reduces emissions.

In some examples, the fan shroud assembly 28 includes one or more features 40, 42. For instance, the features can be a reservoir for windshield washer fluid 40 and a reservoir for coolant 42. Because the fan shroud 28 assembly is adjacent the radiator 26 (FIGS. 1-2), coolant from the reservoir for coolant 42 can be provided to the radiator 26 by a relatively short hose and allow coolant to move back and forth from the radiator 26 to the reservoir for coolant 42. In other examples, the fan shroud assembly 28 includes other features.

Because the fan shroud assembly 28 removes heat from the engine 30 and engine compartment 29 by taking in hot air from the engine 30 and provides cool air to various parts of a vehicle, it enables the use of lightweight plastic materials that do not need to withstand high heats. In one example, the fan shroud assembly 28 is molded from polypropylene. In another example, the fan shroud assembly 28 is made from a composite material that includes a plastic matrix and fillers such as talc or glass. In a particular example, the material includes up to 20% talc filler in a polypropylene matrix. In another example, the fan housing 32, air induction intake box 35, and/or features 40, 42 are integral with the fan shroud assembly 28. That is, the fan housing 32, air induction intake box 35, and/or features 40, 42 are integrally molded with the fan shroud assembly 28 as a single, monolithic component. This eliminates the need for mounting brackets or other parts for mounting the features 40, 42 into the vehicle, and provides flexibility in placing and sizing the features 40, 42, in turn reducing labor costs and complexity during vehicle assembly. Furthermore, the use of lightweight plastic materials reduces the weight of the vehicle, improving vehicle performance, and reduces the cost of the parts. The fan shroud assembly 28 can be made by any molding process, such as blow molding or injection molding. Finally, by removing hot air from the engine compartment 29 and cooling it, the fan shroud assembly 28 can eliminate the need for heat shields and other parts that typically would be used to protect vehicle components from high heat in the engine compartment 29.

Figure 7:
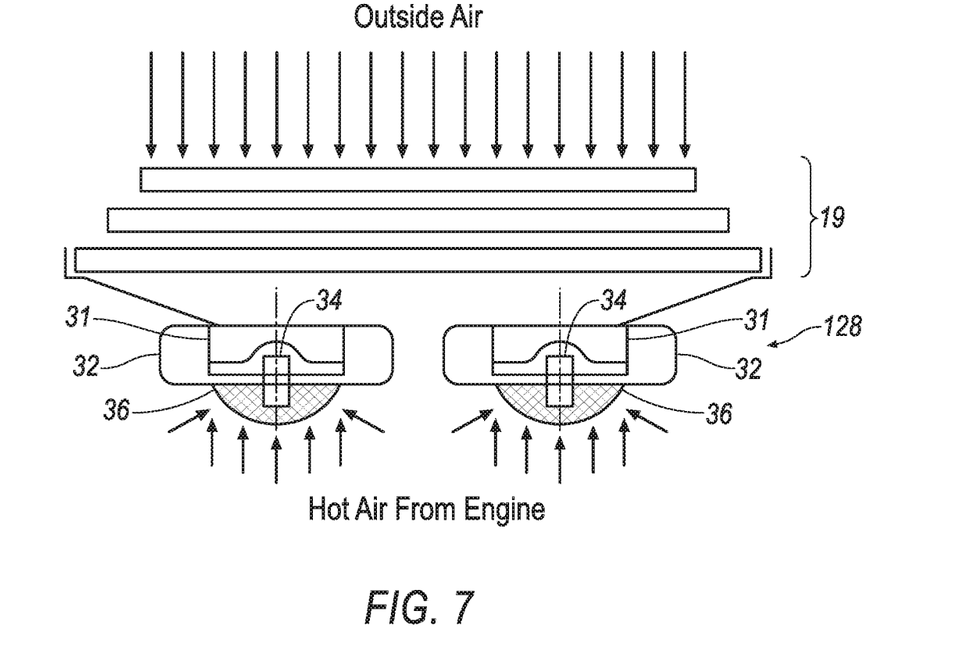
FIG. 7 schematically shows a top-down view of an alternate fan shroud assembly.
Figure 8:
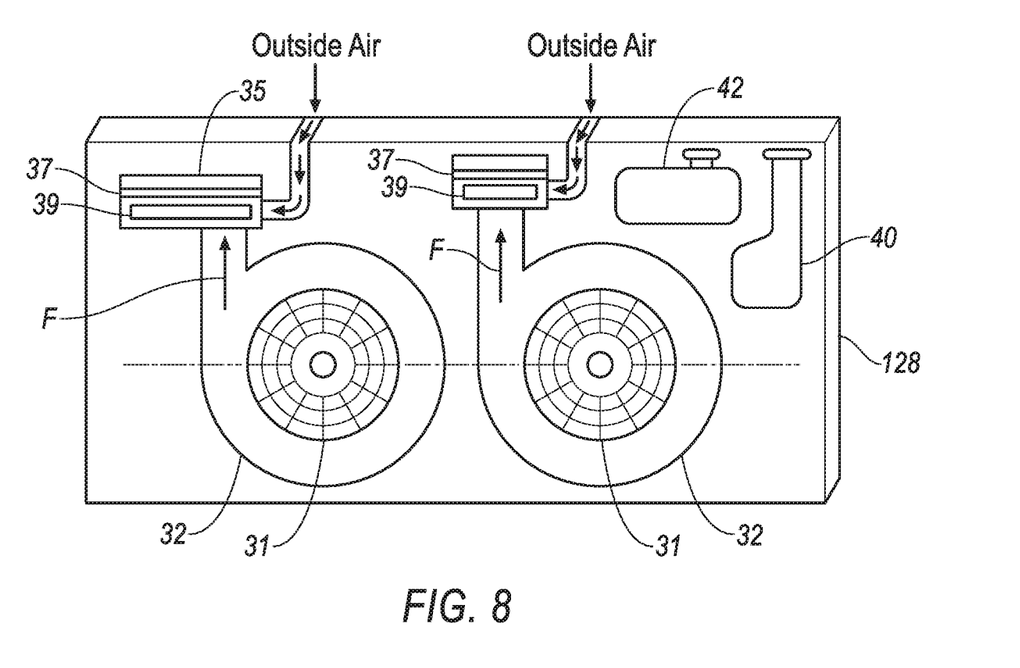
FIG. 8 schematically shows a detail view of the fan shroud assembly of FIG. 7.
Figure 9:
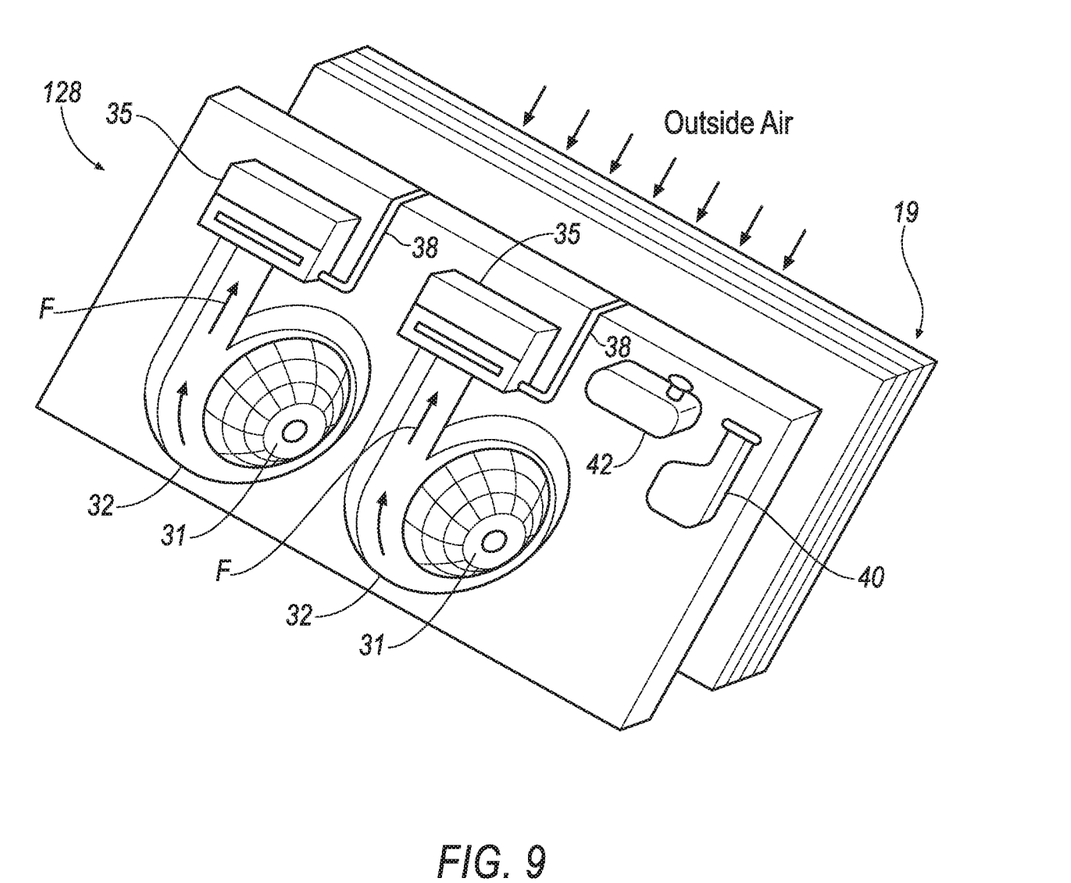
FIG. 9 schematically shows an isometric view of the fan shroud assembly of FIGS. 7-8.

FIGS. 7-9 illustrate an alternate fan shroud assembly 128. The alternate fan housing assembly includes dual fans 31. Each fan 31 is arranged in a fan housing 32. In the example of FIGS. 7-9, each fan 31 feeds air to an air induction intake box 35, which can provide air flow F to various vehicle components, as described above. As above, optional coolers 39 cool airflow F as it leaves the air induction intake boxes 35.

Figure 10:
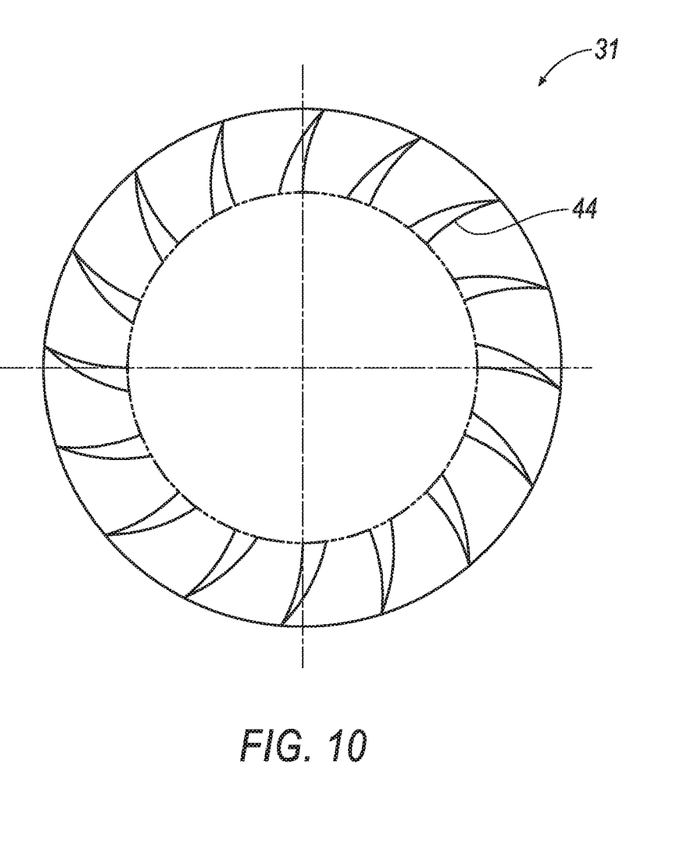
FIG. 10 schematically shows a detail view of a fan in the fan shroud assembly of FIGS. 1-9.
Figure 11:
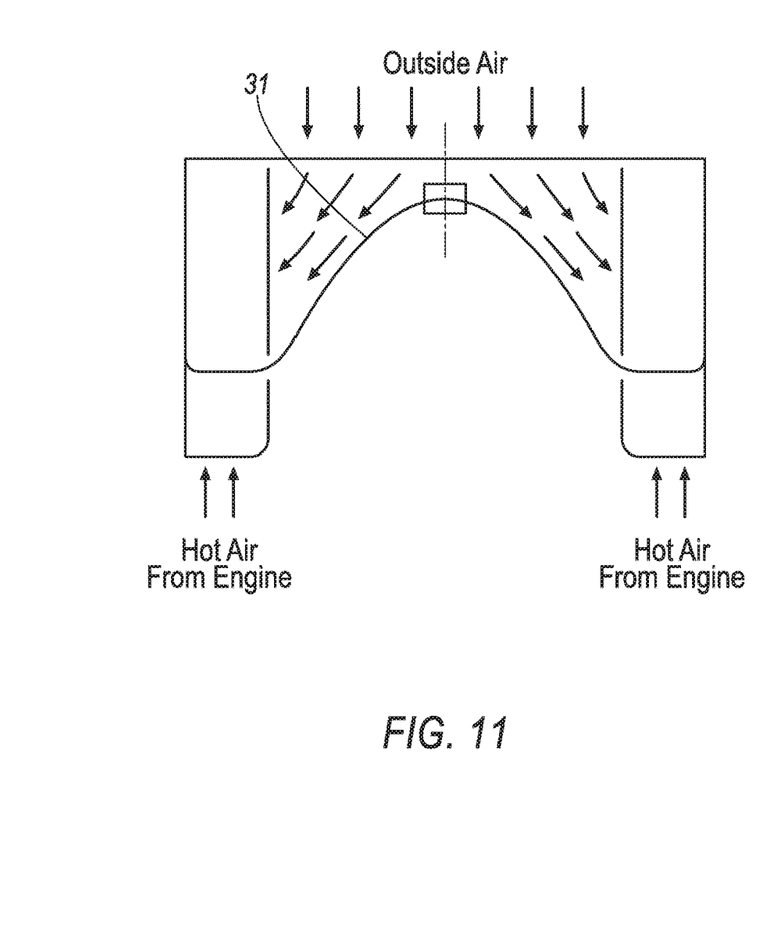
FIG. 11 schematically shows a detail view of a fan blades in the fan shroud assembly of FIGS. 1-10.

FIGS. 10-11 show a detail view of a fan 31 with blades 44 arranged on both sides with rounded tips. The fan 31 generally resembles a cone shape. This shape reduces air turbulence, improves efficiency of the fan, and reduces noise.

Although an embodiment of this disclosure has been explained, a worker of ordinary skill in this art would recognize that certain modifications would come within the spirit and scope of this invention.

The invention claimed is:

1. A fan shroud assembly, comprising:
an air intake duct configured to receive ambient air;
a fan configured to simultaneously receive air from the ambient air and draw hot air from a vehicle engine compartment;
a motor driving the fan; and
an air induction intake box in fluid communication with an output from the fan and the air intake duct to mix the output and the ambient air.

2. The fan shroud assembly of claim 1, wherein the fan is arranged in a fan housing.

3. The fan shroud assembly of claim 1, further comprising a protective screen arranged over the fan.

4. The fan shroud assembly of claim 1, wherein a temperature of air in the air induction intake box is lower than a temperature of the hot air.

5. The fan shroud assembly of claim 4, wherein a temperature of air in the air induction intake box is higher than a temperature of the ambient air.

6. The fan shroud assembly of claim 1, further comprising a cooler in the air induction intake box configured to cool the air in the air induction intake box.

7. The fan shroud assembly of claim 6, wherein a temperature of air in the air induction intake box is lower than a temperature of the ambient air and a temperature of the hot air.

8. The fan shroud assembly of claim 6, wherein the cooler is an evaporative heat exchanger.

9. The fan shroud assembly of claim 1, wherein the fan shroud assembly comprises a plastic material.

10. The fan shroud assembly of claim 9, further comprising a reservoir integral with the fan shroud assembly.

11. The fan shroud assembly of claim 1, wherein the hot air is from a vehicle engine compartment.

12. The fan shroud assembly of claim 1, wherein the air induction intake box provides cooling air to a vehicle engine.

13. The fan shroud assembly of claim 1, wherein the fan is a first fan, and further comprising a second fan configured to configured to simultaneously receive air from the ambient air and draw hot air from the vehicle engine compartment.

14. The fan shroud assembly of claim 1, wherein the fan generally resembles a cone shape and has blades arranged on first and second sides of the fan.

15. A vehicle, comprising:
an engine arranged in an engine compartment; and
a fan shroud assembly including
an air intake duct configured to receive ambient air from outside the vehicle, a fan configured to simultaneously receive air from the ambient air and draw hot air from the engine compartment, the fan being driven by a motor, and an air induction intake box in fluid communication with an output from the fan and the air intake duct to mix the output and the ambient air to form cooling air, the air induction intake box configured to provide the cooling air to a vehicle component.

16. The vehicle of claim 15, wherein the cooling air is provided to the engine.

17. The vehicle of claim 15, wherein a temperature of air in the air induction intake box is lower than a temperature of the hot air.

18. The vehicle of claim 15, further comprising a cooler in the air induction intake box configured to cool the air in the air induction intake box.

19. The vehicle of claim 15, wherein the fan shroud assembly comprises a plastic material, and further comprising at least one reservoir integral with the fan shroud assembly.

20. A method of providing cooling air to a vehicle engine, comprising:

simultaneously drawing ambient air from outside a vehicle and drawing hot air from an engine of a vehicle with a fan;

mixing an output from the fan with ambient air from outside the vehicle; and providing the mixed air back to the engine, wherein the mixed air has a temperature that is lower than a temperature of the hot air due to the mixing.

* * * * *